United States Patent [19]

Avrea

[11] 4,006,775
[45] Feb. 8, 1977

[54] AUTOMATIC POSITIVE ANTI-AERATION SYSTEM FOR ENGINE COOLING SYSTEM

[76] Inventor: Walter C. Avrea, 4540 S. Rural Road, Apt. L-7, Tempe, Ariz. 85282

[22] Filed: July 18, 1974

[21] Appl. No.: 489,584

Related U.S. Application Data

[63] Continuation-in-part of Ser. No. 449,025, March 7, 1974, abandoned.

[52] U.S. Cl. .................................. 165/51; 165/107; 123/41.54
[51] Int. Cl.[2] .......................................... F01P 11/02
[58] Field of Search ........... 165/51, 107; 123/41.54

[56] References Cited

UNITED STATES PATENTS

| | | | |
|---|---|---|---|
| 3,077,927 | 2/1963 | White et al. ................ | 123/41.54 X |
| 3,132,634 | 5/1964 | Butler ............................ | 123/41.54 |
| 3,162,182 | 12/1964 | Gratzmuller .................... | 123/41.54 |
| 3,499,481 | 3/1970 | Avrea ........................ | 123/41.54 X |
| 3,601,181 | 8/1971 | Avrea ........................ | 123/41.54 X |

*Primary Examiner*—Albert W. Davis, Jr.
*Attorney, Agent, or Firm*—Drummond, Nelson & Ptak

[57] ABSTRACT

An automatic, positive anti-aeration system is assembled to function cooperatively with an engine cooling system radiator as an integral unit. An accumulator, vented to the atmosphere and containing a substantial amount of coolant liquid, is positioned adjacent to the radiator. Two separate fluid passages communicate respectively between the upper portion of one of the header tanks and the accumulator and between the lower portion of one of the header tanks and the accumulator. Valves control fluid flow in the two passages. When the pressure in the header tank rises above the preselected system operating pressure due to heating and expansion of the coolant liquid, the valve in the upper fluid passage opens, allowing coolant liquid and any gases trapped in the top of the header tank to flow into the accumulator. The gases are vented from the accumulator to the atmosphere and the coolant liquid is stored in the accumulator. When the coolant liquid cools and contracts, lowering the pressure in the cooling system to at least below the preselected system operating pressure, the valve in the lower coolant passageway opens, allowing coolant, but no air, to flow from the accumulator into the header tank. Using this system, the conventional radiator pressure cap and filler neck can be eliminated. The entire cooling system is filled and practically purged of air by pouring coolant into the accumulator.

1 Claim, 12 Drawing Figures

AUTOMATIC POSITIVE ANTI-AERATION SYSTEM FOR ENGINE COOLING SYSTEM

This application is a continuation-in-part of Ser. No. 449,025, filed Mar. 7, 1974, now abandoned.

This invention relates to cooling systems for liquid-cooled internal combustion engines.

More particularly, the invention relates to a combination of a radiator and automatic positive anti-aeration system which are assembled to function cooperatively as an integral unit.

In still another respect, the invention relates to a combination system of the type described specially adapted for installation as original equipment.

In my issued U.S. Pat. Nos. Re. 27,965 and 3,601,181, I describe methods and apparatus useful in the practice thereof for operating a semi-closed cooling liquid circuit for an internal combustion engine. Kits embodying the inventions described in my said issued patents have achieved wide use in the automotive industry for converting conventional engine cooling systems to operate in accordance with the method disclosed in my said patents. These kits generally consist of a specially constructed radiator cap having a two-way checkvalve, a plastic bottle forming a coolant reservoir and a length of tubing which is attached at one end to the conventional radiator overflow outlet and the other end of the tubing terminates in the lower portion of the coolant reservoir.

Although such kits normally function quite well, they do suffer certain disadvantages. The principal disadvantage of the use of the kits described in my issued patents arises from the difficulty and cost in constructing the special radiator cap, which has reliability problems of the same type associated with conventional radiator caps. In another respect, use of the present kit is undesirable because of the inherent problems associated with external plumbing of any kind in an automobile engine compartment. The special hose mentioned above may be dislocated or severed during maintenance or operation of the engine and suffers from normal deterioration of the plastics or rubber from which it is constructed. Also, space limitations usually dictate that the plastic reservoir bottle be located at a relatively low position in the engine compartment and the make-up water returned to the radiator as the engine cools must be lifted from the bottle up through the hose to the radiator filler neck where the hose is attached to the overflow fitting. This may lead to air leaking into the cooling system through cracks, loose tubing connections or faulty radiator caps.

Finally, use of the kits described in my issued patents do not provide any improvement in the manner in which conventional cooling systems are initially filled with the coolant liquid. The coolant liquid must still be poured into the top of the radiator through the conventional filler neck. The coolant liquid then percolates downwardly through the air in the radiator core and through the engine cooling jacket passageways and substantial quantities of air remain trapped in pockets in the cooling system. This air must then be eventually displaced during several heating and cooling cycles in the manner described in my issued patents.

The need clearly exists for an improvement in the conventional cooling system which would permit the radiator and the engine cooling water jackets to be filled by introducing water at or near the bottom thereof so as to more uniformly displace the air initially in an empty system upwardly, minimizing the amount of air trapped in pockets in the radiator or in the engine cooling jacket.

When the kit described in my said issued patents is employed as original equipment, the expense of the system is unnecessarily high due to needless steps in the manufacture of the radiator, the expense of the special radiator cap which can be entirely omitted in accordance with the invention disclosed in this application, and the extra labor required to handle and store the kits as separate units.

Accordingly, it would be highly advantageous to provide a combination radiator-automatic positive anti-aeration system in which the components are assembled to function cooperatively as an integral unit, in which external plumbing is either entirely eliminated or reduced to a practical minimum and in which the overall cost of the combination system is significantly reduced while improving the long-term reliability and efficiency thereof.

It is, therefore, the principal object of the present invention to provide a combination radiator - automatic positive anti-aeration system in which the components are assembled to function cooperatively as an integral unit in a more efficient manner than described in my said issued patents.

Another important object of the invention is to provide a combination apparatus of the type described, specially adapted for installation as original equipment in automobiles and other vehicles or fixed equipment having liquid-cooled engines.

Still another important object of the invention is the provision of such combination apparatus as an integral unit, the cost of which is significantly lower than the cost of providing the same functions by means of modification of standard radiator cooling systems by the installation of a kit, as described above.

Another and further important objective of the invention is to provide such a system, integrally combined with a radiator, in such manner that the system does not require a specially constructed radiator cap or filler neck and, indeed, employs no radiator cap or filler neck as the terms are conventionally understood, providing significant improvement in the safety of operating and servicing liquid-cooled engines.

Still another, further and more specific object of the invention is to provide combination apparatus of the type described having means for quickly and conveniently adjusting the pressure at which the engine cooling system operates to anyone of a plurality of preselected levels.

These and other, further and more specific objects and advantages of the invention will be apparent to those skilled in the art from the following detailed description thereof taken in conjunction with the drawings, in which:

Briefly, in accordance with my invention, I provide improvements for use in combination with the cooling radiator of a liquid-cooled internal combustion engine. Such radiator typically comprises core means providing indirect heat exchange between engine coolant liquid flowing internally therethrough and an external cooling fluid, usually air. The typical radiator will also include an inlet header tank enclosing the inlet of the core and which is adapted for fluid connection to the coolant liquid outlet of the engine. Similarly, an outlet header tank encloses the outlet of the core and is adapted for fluid connection to the coolant liquid inlet of the engine.

The improvements constituting the invention comprise an automatic, positive anti-aeration system adapted to function cooperatively with the above-described typical radiator, as an integral unit. The improvements include means defining a liquid-tight coolant liquid accumulator; means defining an inlet port in the accumulator; first passage means providing fluid communication between the accumulator inlet port and the upper portion of a first one of said header tanks; normally closed first valve means for closing said first passage means, adapted to open when the pressure in said first header tank reaches at least a first predetermined pressure higher than ambient atmospheric pressure, allowing coolant liquid and gases trapped in the upper portion of said first header tank to flow through said inlet port into the accumulator; means for venting gases entering said accumulator to the atmosphere; means defining an outlet port in the accumulator; second passage means providing fluid communication between one of said header tanks and said accumulator outlet port; second valve means for closing said second passage means, adapted to open when the pressure in said radiator falls at least below a second predetermined pressure lower than said first predetermined pressure, allowing coolant fluid in said reservoir to flow into said radiator; and means for introducing an initial quantity of make-up coolant liquid into said accumulator, said accumulator being shaped and dimensioned to receive an initial quantity of coolant liquid, the surface level of which is above said outlet port, and to receive and temporarily store at least the volume of coolant liquid which flows through said accumulator inlet port when the pressure in said first header reaches said first predetermined pressure.

Figure 1:
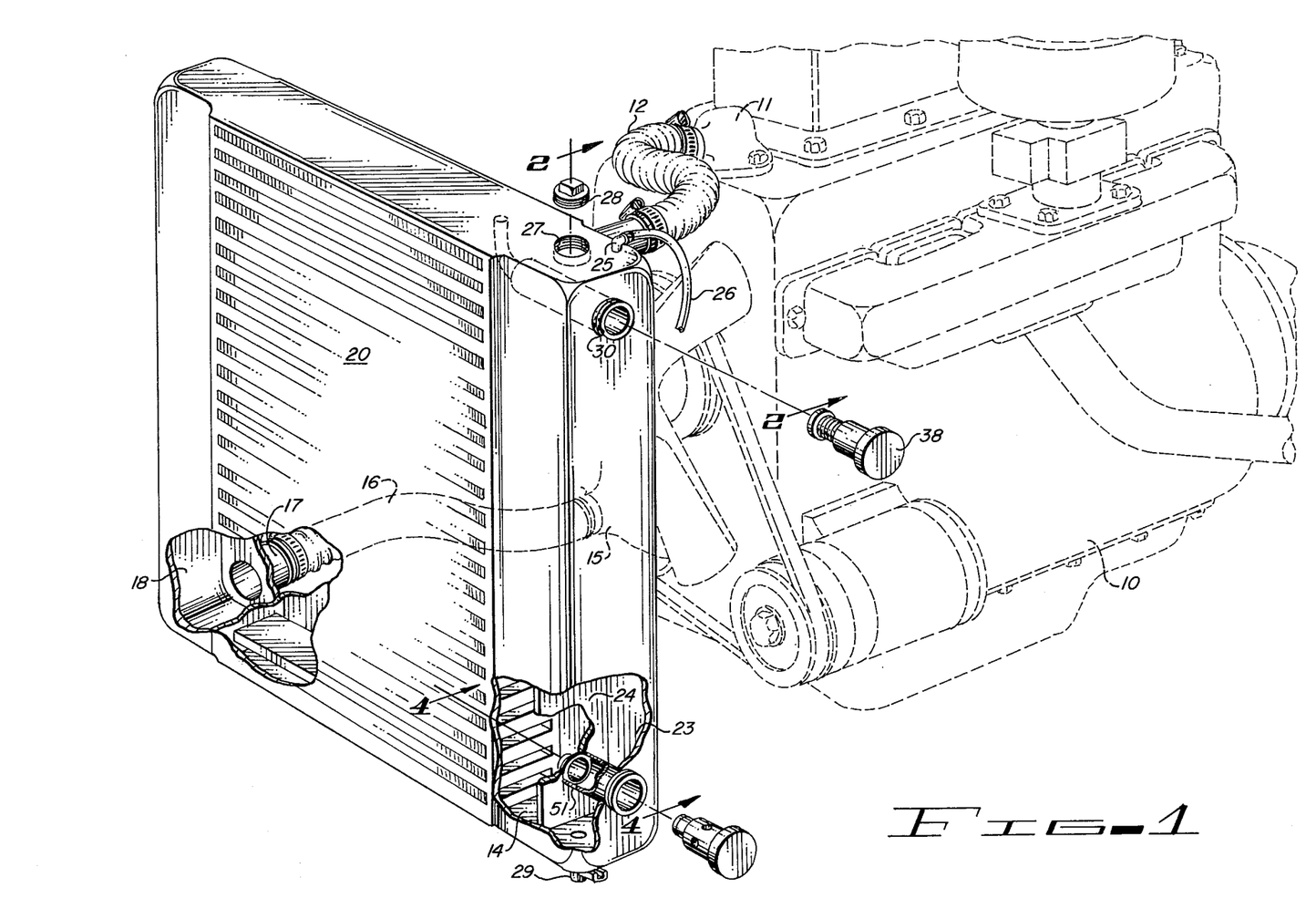
FIG. 1 is a perspective view of a combination system, constructed in accordance with the presently preferred embodiment of the invention, showing the relation of the combination unit to a conventional internal combustion engine, shown in dashed lines, in a typical installation.

Turning to the drawings, FIG. 1 illustrates a conventional internal combustion engine 10 (shown in dashed lines) operatively connected to a combination radiator - automatic coolant de-aeration replenishing system formed as an integral unit in accordance with the presently preferred embodiment of the invention. The outlet 11 of the closed cooling liquid circuit of the engine 10 is connected by means of a flexible hose 12 to the inlet nipple 13 of the radiator inlet header tank 14. The inlet 15 of the cooling circuit of the engine 10 is connected by another flexible hose 16 to the outlet nipple 17 of the outlet header tank 18.

Figure 2:
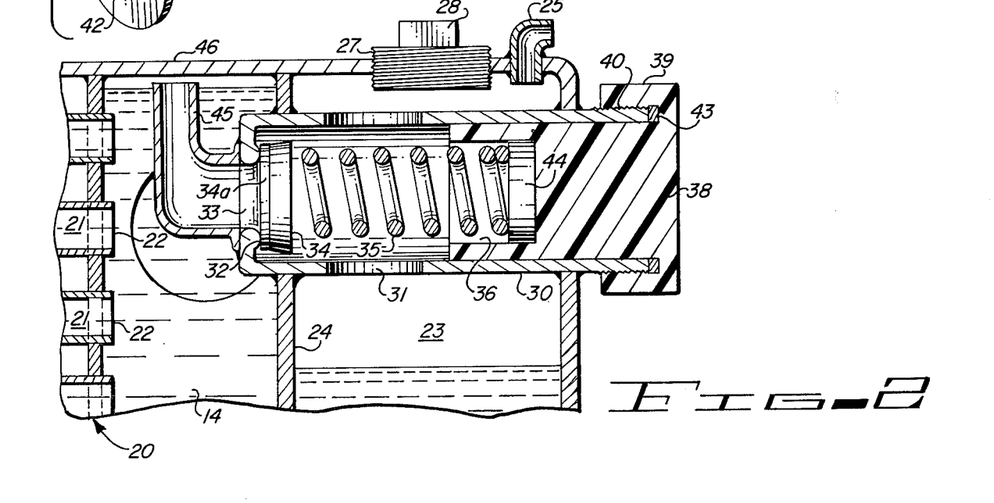
FIG. 2 is a partial sectional assembly view of the combination unit of FIG. 1, taken along section line 2—2 thereof, showing details of the valving and upper filler plug.
Figure 3:
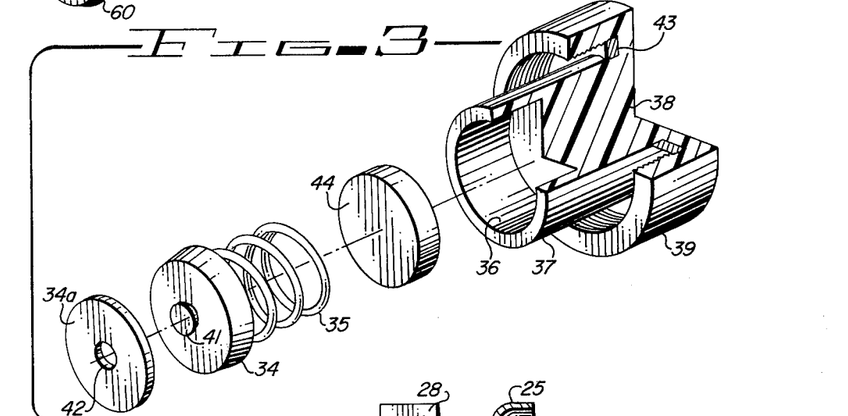
FIG. 3 is an exploded perspective view of the valve components of FIg. 2.

Referring now also to FIGS. 2–3, in which like reference numerals identify corresponding parts, the combination unit consists of a conventional cross-flow radiator core, generally indicated by reference numeral 20, consisting of spaced parallel finned cooling tubes 21, the inlet ends 22 of which communicate with the interior of the inlet header tank 14. A separate liquid-tight accumulator compartment 23 is formed adjacent the header tank 14 and separated therefrom by an internal wall 24. The accumulator 23 is vented to the atmosphere through a vent fitting 25 to which a conventional radiator drain hose 26 is attached. A filling opening 27 is provided in the top of the accumulator 23 which is normally closed by a threaded or snap-in type plug 28. A drain cock 29 is provided in the bottom of the accumulator 23 to periodically permit draining sediment, sludge or excess coolant liquid therefrom. A cylindrical valve body 30 having at least one discharge port 31 therein, extends through the accumulator 23 and carries a valve seat 32 having an inlet port 33 which is normally closed by a plug member 34 faced with a gasket 34a which is urged to the normally closed position by a compression spring 35 received in a recess 36 formed in the shank portion 37 of a plug 38 having an internally threaded cap portion 39 which engages external threads 40 formed on the outer end of the valve body.

The gasket member 34a is located on the plug member 34 by an undercut pin member 41 projecting through an aperture 42 in the center of the gasket 34a. A sealing gasket 43 is carried inside the cap portion 39 of the plug 38 to effectively seal the plug 38 to the outer end of the valve body member 30.

The pressure exerted by the spring 35 can be adjustably varied by changing the thickness of a spacer 44 carried in the recess 36 formed in the shank 37 of the plug 38.

As shown in FIG. 2, the valve body 30 is located very close to the top of the accumulator 23 in order to insure that any air or other gaseous fluid trapped in the upper portion of the inlet header 14 can escape into the top portion of the accumulator 23 when the valve opens. To enhance this feature, a conduit 45 extends upwardly from the inlet opening 33 of the valve body and terminates just below the top wall 46 of the inlet header 14.

The spring 35 is sized and selected to permit the plug 34 to be forced away from the seat 32 when the pressure within the header tank 14 rises above the desired preselected operating pressure of the closed circuit cooling system. Thus, in a typical automotive application, the valve will open at a pressure of say 14 psig. When the valve opens, as described, any air and vapor in the top of the inlet header tank 14 is expelled into the top of the accumulator 23 and is thence vented to the atmosphere through the vent fitting 25 and drain hose 26. Any coolant liquid passing through the opened outlet port valve will be retained and stored in the lower portion of the accumulator 23.

Figure 4:
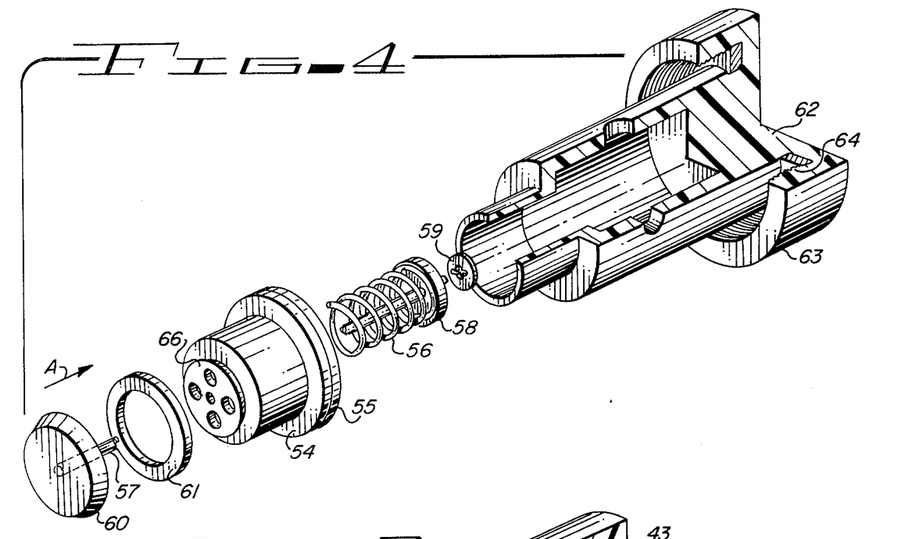
FIG. 4 is a partial sectional view of the unit of FIG. 1 taken along section line 4—4 thereof showing details of the valving and drainage components.
Figure 5:
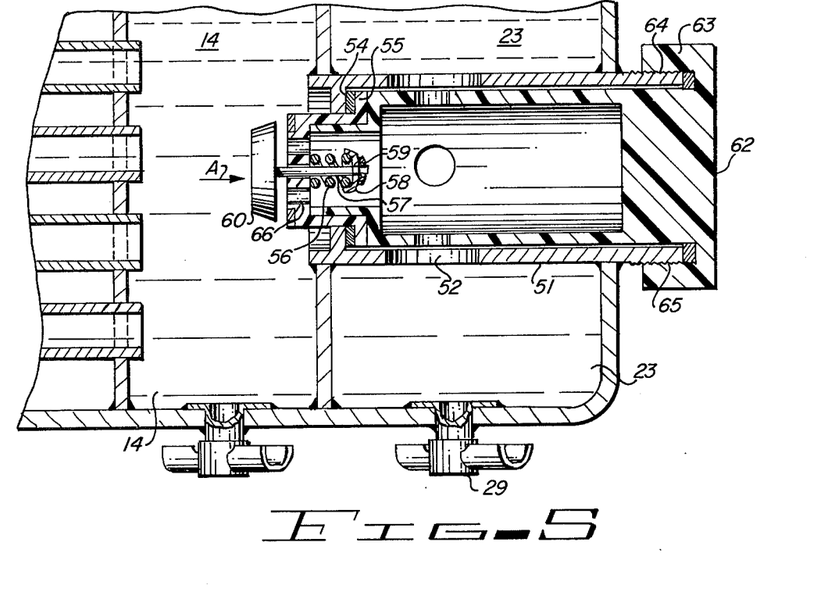
FIG. 5 is an exploded perspective view of the valve components of FIG. 4.

Referring now to FIGs. 1 and 4–5, a second valve body 51 also extends through the accumulator 23 and communicates with a lower portion of the header tank 14. The valve body 51 is provided with openings 52 communicating with the interior of the accumulator 23. An internal annular shoulder 53 in the valve body 51 locates an annular sealing gasket 54 and a valve seat member 55 which is slidably received over a reduced-diameter portion 56 of the valve body 51. A compression spring 56, located by a pin 57, spring retainer 58 and a speed nut 59, urges a closure member 60 in the direction of the arrow A against a gasket 61 carried in a slot formed on the inner end of the seat member 55. A plug member 62 has a cap portion 63 formed on its outer end and has internal threads 64 which engage external threads 65 formed on the outer end of the valve body 51. When so engaged, the seat member 55 and gasket 54 form a hermetic seal with the interior annular shoulder 53 of the valve body 51. The seat member 55 is also provided with apertures 66 which permit coolant liquid in the accumulator 23 to flow into the header tank 14 when the closure member 60 is displaced against the action of the spring 56 to the open position, as shown in FIG. 5.

The spring 56 is sized and selected such that the closure member 60 will be displaced away from the gasket 61 to the open position as shown in FIG. 5, allowing coolant liquid to flow from the accumulator 23 into the header tank 14 when the pressure in the radiator falls at least below a second predetermined pressure which is lower than the preselected operating pressure determined by the accumulator inlet valve of FIGS. 2–3. Thus, in a typical automotive application, the accumulator outlet valve of FIGS. 4–5 will open when the pressure in the radiator falls to approximately −½ psig due to cooling and contraction of the coolant liquid therewithin. It will be understood by those skilled in the art that the pressure exerted by the compression spring 56 (to urge the closure member 60 in the direction of the arrow A, closing the passages 66) can be preselected to cause the valve of FIGS. 4–5 to open at a differential pressure which is sufficiently low that the entire engine cooling system in a typical automotive installation can be filled by pouring coolant liquid into the top of the accumulator 23, venting air displaced by the coolant liquid to the atmosphere by either unscrewing the upper valve-retaining cap 38 or by the provision of a special adjustable upper valve assembly as shown in FIGS. 9–11, described below.

Figure 6:
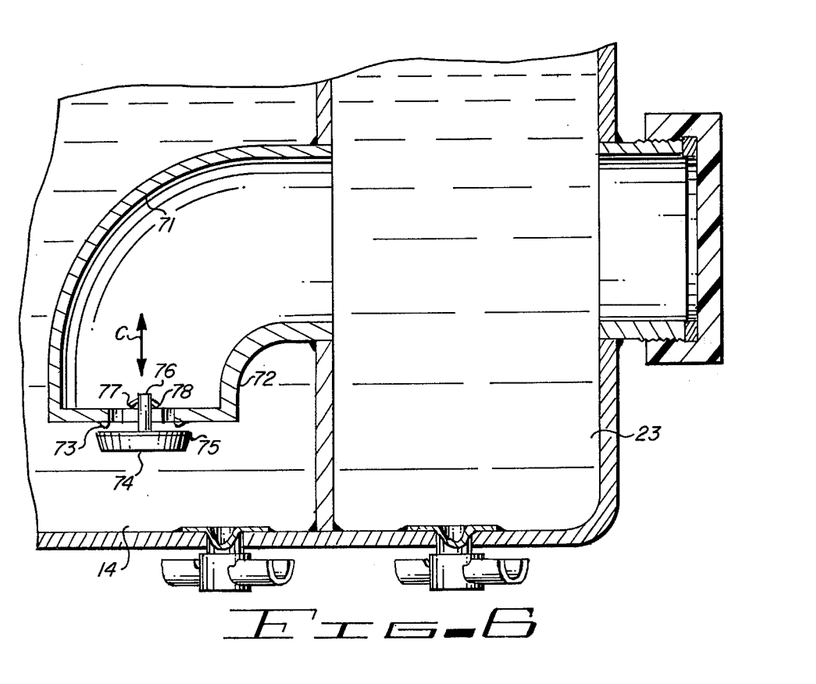
FIG. 6 is a sectional view of an alternate valving system which can be used in place of the valving system of FIGS. 4–5.

FIG. 6 illustrates an alternate embodiment of the invention in which the preferred spring-loaded, normally closed accumulator outlet valve assembly of FIGS. 4–5 is replaced with a simpler gravity-actuated, normally open valve assembly consisting of a conduit member 71 communicating with the interior of the accumulator 23 which terminates in a downwardly depending portion 72 having an annular seat 73. A closure member 74 faced with an appropriate gasket 75 depends from a pin 76 operating in an aperture 77. A suitable clip 78 clips the pin 76 proximate the upper end thereof to permit movement of the pin-closure-gasket assembly in the directions of the arrows C. In this configuration, the valve of FIG. 6 remains open until the pressure drop across the valve is sufficiently high to overcome the gravitational forces tending to keep the valve open. This will normally occur at least when the coolant liquid in the system boils. Thereafter, the valve will remain closed with the engine cooling system pressurized until the temperature of the coolant liquid falls somewhat below the boiling point of the liquid, allowing the valve of FIG. 6 to open. Thus, when the system described herein is provided with the drop valve of FIG. 6 rather than the spring-loaded valve of FIGS. 4–5, the system will operate in a manner generally analogous to that disclosed in the patent to Herbon, U.S. Pat. No. 3,265,048.

Figure 7:
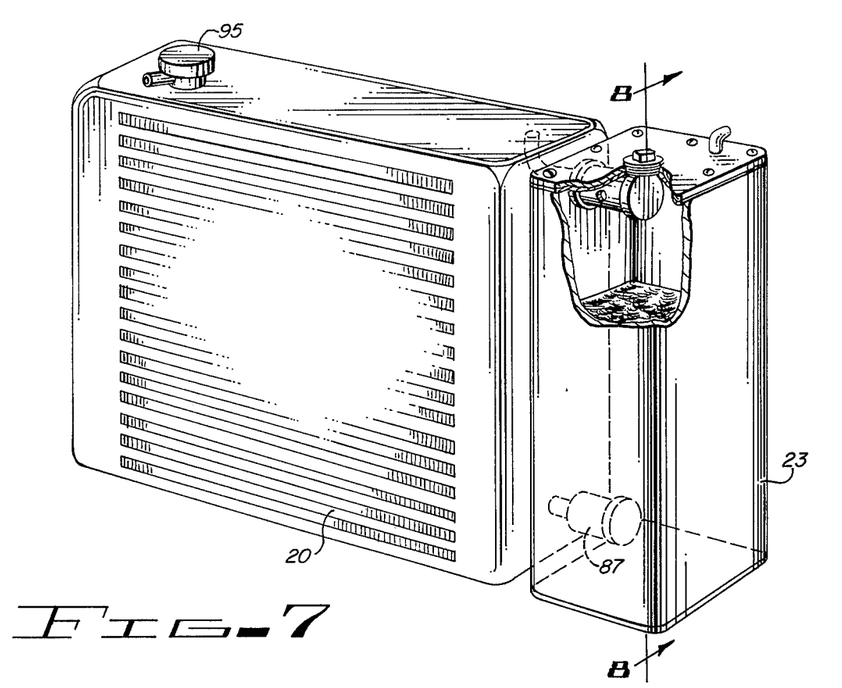
FIG. 7 is a perspective view showing a further embodiment of the invention which can be used as the alternate to the preferred embodiment shown in FIG. 1.
Figure 8:
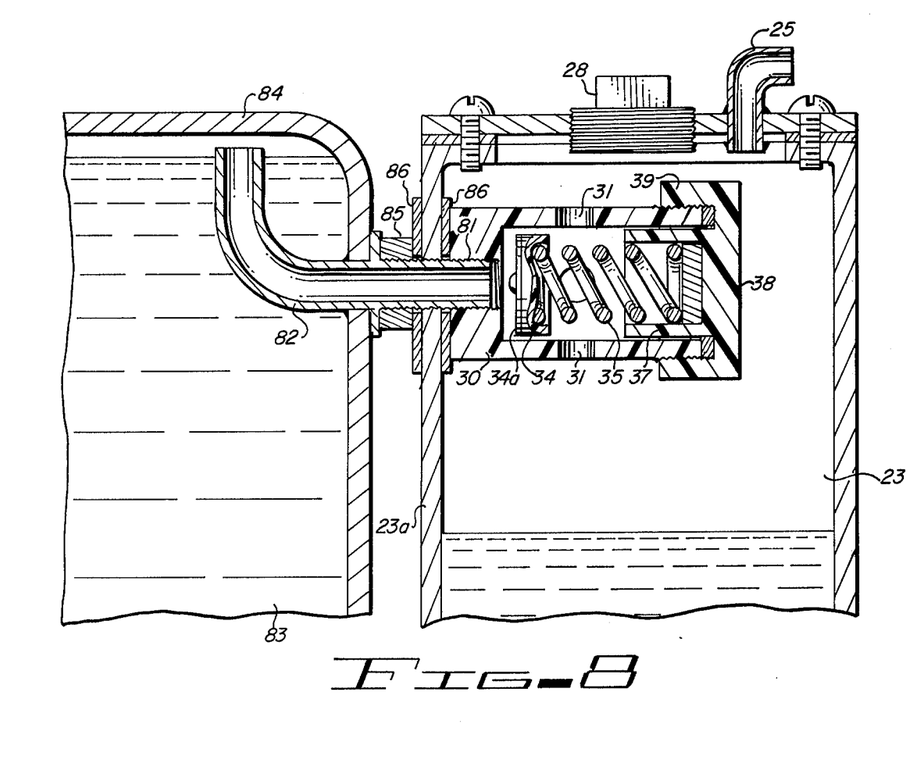
FIG. 8 is a sectional view of the unit of FIG. 7 taken along section line 8—8 thereof.

FIGS. 7–8 depict still another alternate embodiment of the invention in which the accumulator 23 is formed separately from the radiator 20 so as to permit conventional cooling systems to be modified to operate in accordance with the present invention. In general, the system of FIGS. 7–8 consists of the separate accumulator 23 provided with an atmospheric vent 25 and a threaded closure 28. The accumulator inlet valve assembly consists of a valve body 30 having openings 31, a closure member 34 faced with a gasket 34a, and a compression spring 35 retained within a recess formed in the inner end of the shank portion 37 of a threaded cap 38 which engages threads 39 formed on the outer end of the valve body 31. The valve body 31 and related components are retained in position by threaded engagement with the outer end 81 of a conduit 82 extending through the wall 23a of the accumulator 23 into the header 83 of the radiator 20 and upwardly almost to the top 84 of the header 83. A gasket 85 and washers 86 provide a seal to prevent leakage of coolant liquid from the accumulator 23. Details of the lower valve assembly 87 are omitted from FIG. 7 but are generally in accordance with those depicted in either FIGS. 5 or 6.

Figures 9, 10:
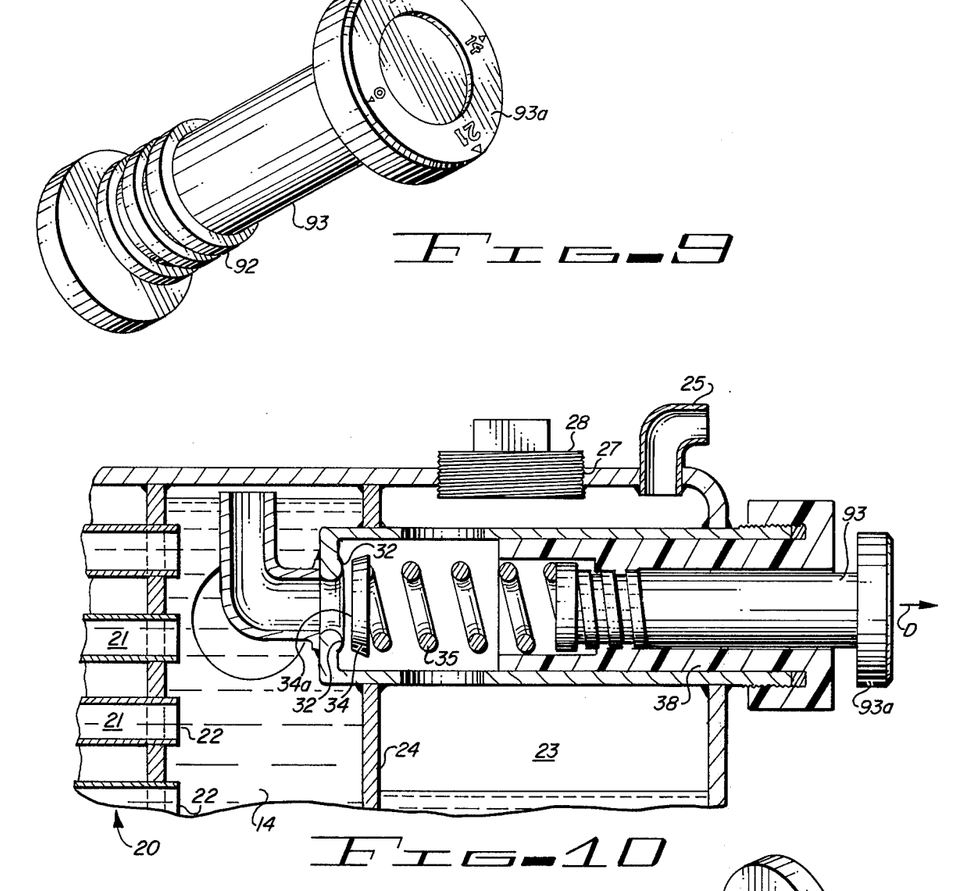
FIGS. 9, 10 and 11 are, respectively, perspective, sectional and cut-away exploded perspective views of an alternately preferred embodiment of the upper valving system useful as an alternate to the components illustrated in FIGS. 2–3.
Figure 11:
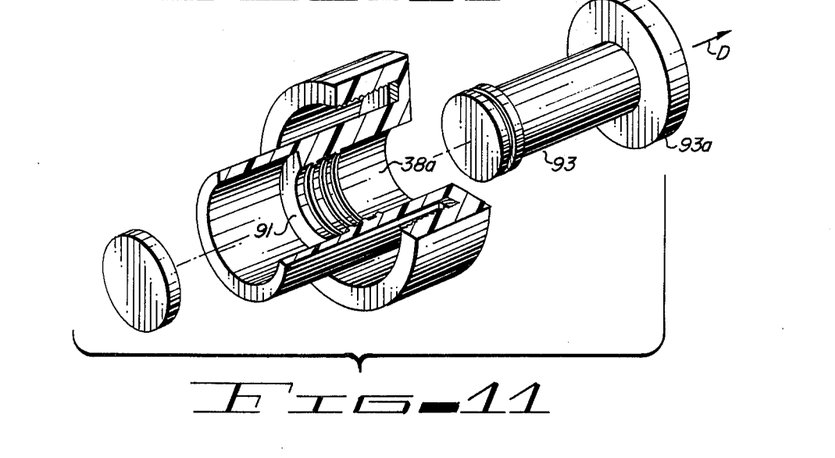

An alternate form of the upper accumulator inlet valve of FIGS. 2–3 is shown in FIGS. 9–11. In this alternate embodiment of the invention, the pressure exerted by the compression spring 35 against the closure member 34 to urge the gasket 34a into sealing engagement with the annular seat can be adjustably varied by a simple manual operation. As shown in FIGS. 9–11, the closure plug 38 is provided with an axial bore 38a having internal threads 91 which engage external threads 92 formed on the inner end of a pressure-adjusting screw 93. Proper selection of the pitch of the threads 92 makes it possible to fully retract the pressure-adjusting screw 93 in the direction of the arrow D by turning the screw 93 one full turn. This, in turn, varies the pressure exerted by the spring 35 on the closure member and gasket 34–34a to provide for varying the pressure at which the valve opens to allow escape of air and coolant liquid from the header 14 into the accumulator 23. The cap portion 93a may be suitably provided with graduations to indicate a plurality of preselected cooling system operating pressures. In the presently preferred embodiment, the cap member is calibrated to indicate the rotational position of the screw member 93 to provide cooling system operating pressures of 0 psig, 7 psig, 14 psig and 21 psig. The screw 93 is turned to the 0 psig position to permit filling the engine cooling system while simultaneously displacing air therefrom, in the manner previously described. According to this mode, it is generally possible to completely purge the engine cooling system of a conventional automobile during the first heating cycle after the system is filled with coolant liquid. The coolant liquid is merely poured into the accumulator 23 through the closure opening 27. The hydrostatic pressure of the head of coolant liquid in the accumulator causes the accumulator outlet valve (see FIGS. 5 or 6) to open, coolant liquid flows into the header 14 of the radiator 20 through the lower radiator cooling tubes 21, and into the engine through the radiator outlet 17 and conduit 16. Air which is displaced within the radiator and within the cooling passages of the engine flows through the engine coolant liquid outlet 11 and conduit 12 into the upper portion of the header tank 14 and ultimately escapes through the accumulator inlet valve (see FIGS. 9-11) and is vented to the atmosphere through the vent fitting 25. Any small amounts of air remaining entrapped within the engine are usually purged from the engine cooling system during the very first operating cycle thereafter. As will be appreciated by those skilled in the art, this same effect coult also be achieved by removing the radiator cap 95 (see FIG. 7) of a conventional radiator or by providing a simple purge valve in the top portion of the header 14.

Figure 12:
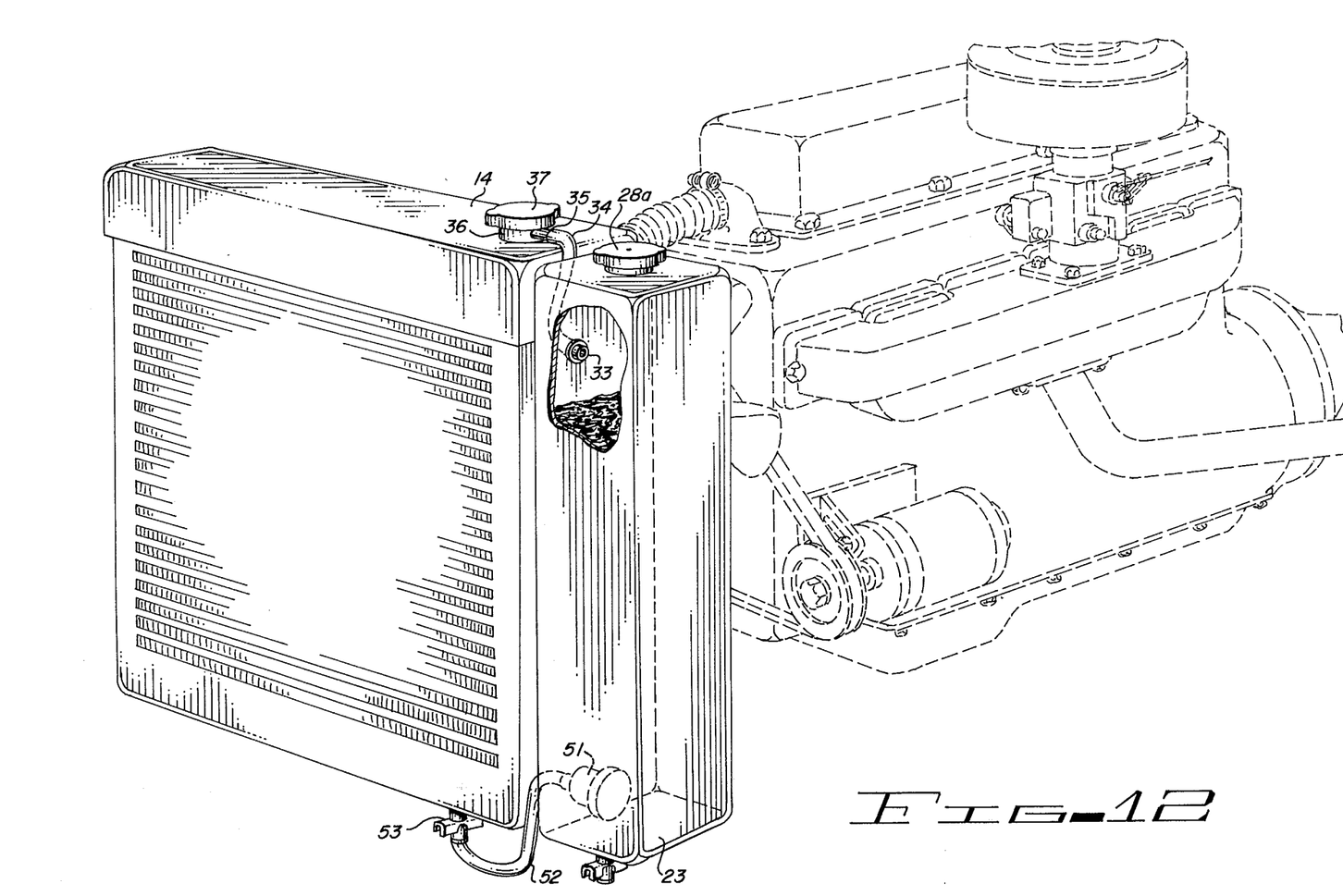
FIG. 12 is a perspective view of yet another embodiment of my invention.

FIG. 12 is a partially cut-away perspective view of yet another embodiment of the invention. The accumulator 23 has a fill opening which is normally closed by a vented cap 28a. The inlet opening 33 communicates by means of a conduit 34 with the normal overflow fitting 35 of a conventional radiator neck 36 which is closed by a radiator cap 37 containing a one-way check valve which prevents the flow of fluid and/or gases from the radiator header tank 14 through the conduit 34 into the accumulator 23 unless the pressure in the header tank 14 exceeds a first predetermined pressure above ambient atmospheric pressure. A second check valve 51 is located in a lower portion of the accumulator 23 below the level of the coolant liquid therein. This check valve 51 may be either the spring-loaded type illustrated in FIG. 5 or the gravity opening type illustrated in FIG. 6. At any rate, the valve 51 opens when the pressure in the radiator falls at least below a second predetermined pressure lower than said first predetermined pressure, allowing coolant fluid in the accumulator 23 to flow into the radiator through a second conduit 52 which may be conveniently connected to the conventional radiator drain cock 53 located on the lower portion of the radiator. While this embodiment does not achieve all of the stated advantages of the invention (because of the external plumbing involved), it does function in the desired manner since it accomplishes automatic and positive anti-aeration of the engine cooling system and since the cooling system can be practically completely filled with water and purged of air initially by merely pouring the coolant liquid into the top of the accumulator 23.

As will be apparent from the description and drawings of my invention set forth herein, the systems disclosed provide an automatic and positive anti-aeration system for an engine cooling system. Thus, instead of accepting the problems caused by aeration of a cooling system and attempting to solve these problems by de-aeration, the apparatus described herein provides a convenient and highly effective means of practically completely filling an engine cooling system with coolant liquid before any operation thereof and any minute quantities of air which may be entrapped in the system are then removed during the very first engine heating cycle. By contrast, in the most effective prior art engine cooling system such as, for example, the system described in my said previously issued patents, it generally required upwards of 4–6 heating/cooling cycles to assure de-aeration of the system. Additionally, the apparatus and system disclosed herein insures that aeration will not occur during subsequent operating cycles since there is always a column of coolant liquid applying a hydrostatic head pressure at the point where coolant liquid is drawn into the system upon cooling. This positively avoids the problems encountered in some applications of the kit system described above in which water is sucked into the cooling system from a reservoir which is oftentimes located at a point well below the radiator coolant liquid inlet valve. The system envisaged herein makes it possible to effect extremely significant economies in the manufacture of engine cooling systems. The conventional radiator cap and the filler neck which is formed in the radiator by a separate manufacturing operation can be completely eliminated. All external plumbing is eliminated. Finally, since the system so positively and automatically provides the anti-aeration function, the radiator core and header tanks can be formed of less-expensive and lighter materials such as aluminum rather than brass. This substitution is possible because most of the corrosion problems which formerly dictated the use of brass radiator construction materials are eliminated or reduced to a practical minimum by positive and automatic anti-aeration.

Having now fully described my invention and the various presently preferred and alternate embodiments thereof, I claim:

1. For use in combination with a cooling radiator for a liquid-cooled internal combustion engine, said radiator comprising core means providing indirect heat exchange between engine coolant liquid flowing internally therethrough and an external cooling fluid, an inlet header tank enclosing the inlet of said core means and adapted for fluid connection to the coolant liquid outlet of said engine, and an outlet header tank enclosing the outlet of said core means and adapted for fluid connection to the coolant liquid inlet of said engine, the improvemenets comprising an automatic, positive anti-aeration system adapted to function cooperatively with said radiator as an integral unit, said improvements comprising:

a. means defining a liquid-tight coolant liquid accumulator;
   b. means defining an inlet port in said accumulator;
   c. first passage means providing a first separate path of fluid communication between said accumulator inlet port and the upper portion of a first one of said header tanks;
   d. normally closed first valve means for closing said first passage means, adapted to open when the pressure in said first header tank reaches at least a first predetermined pressure higher than ambient atmospheric pressure, allowing coolant liquid and gases trapped in the upper portion of said first header tank to flow into said accumulator;
   e. means for venting gases entering said accumulator to the atmosphere;
   f. means defining an outlet port in the lower portion of said accumulator;
   g. second passage means separate from said first passage means providing a second separate path of fluid communication between said accumulator outlet port and the lower portion of one of said header tanks;

h. second valve means for closing said second passage means, adapted to open when the pressure in said radiator falls at least below a second predetermined pressure lower than said first predetermined pressure, allowing coolant fluid in said accumulator to flow into said radiator; and i. means for introducing an initial quantity of make-up coolant liquid into said accumulator, said accumulator being shaped and dimensioned to receive an initial quantity of coolant liquid, the surface level of which is above said outlet port, and to receive and temporarily store at least the volume of coolant liquid which flows through said accumulator inlet port when the pressure in said first header reaches said first predetermined pressure.

* * * * *